Nov. 12, 1963  R. WILDBOLZ ETAL  3,110,062
BALE RASP

Filed Jan. 18, 1961   4 Sheets-Sheet 1

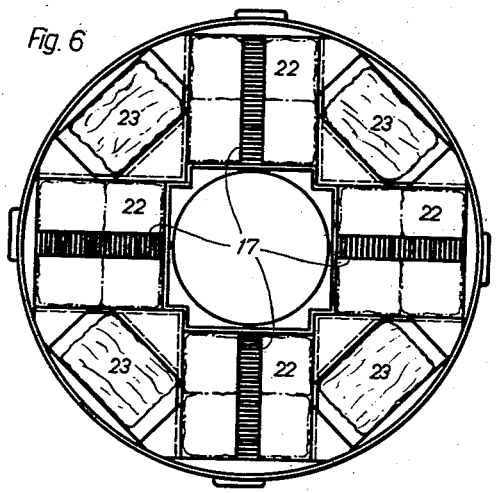
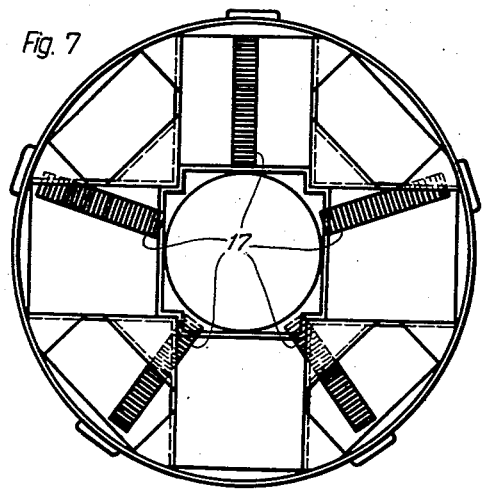

3,110,062
BALE RASP
Rudolf Wildbolz and Christian Just, Winterthur, Switzerland, assignors to Rieter Machine Works Ltd., Winterthur, Switzerland, a corporation of Switzerland
Filed Jan. 18, 1961, Ser. No. 83,443
Claims priority, application Switzerland Oct. 31, 1960
10 Claims. (Cl. 19—80)

The invention relates to a bale rasp for reducing pressed fibre bales as they are worked, for example, in cotton spinning mills.

Bale rasps are known whereby a plurality of reducing elements is arranged in consecutive order and the bales to be reduced are consecutively transported from one reducing element to the following element on rollers or belt conveyors. The travel direction of the bales may be reversed after movement past a reducing element or the bales may continue to travel in the same direction from one reducing element to the subsequent element.

In the arrangement according to the invention the bales slide on a smooth surface of a table in which grates are provided which extend substantially radially from a common center, a rotatable reducing element cooperating with each grate. The bales resting on the table are placed in cells formed by a frame rotating on an axis extending through or close to said common center so that the bales are consecutively passed from one grate to another grate.

The arrangement according to the invention eliminates expensive conveyors or rollers which require extensive maintenance. The starlike arrangement of the reducing devices affords placement of a great bale-reducing capacity in a minimum of space and simultaneous working of a plurality of bales, whereby raw materials of different origin are thoroughly mixed.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 6 is a diagrammatic plan view of the rasp shown in FIG. 1.

FIG. 7 is a diagrammatic plan view of a modified bale rasp according to the invention.

Figure 1:
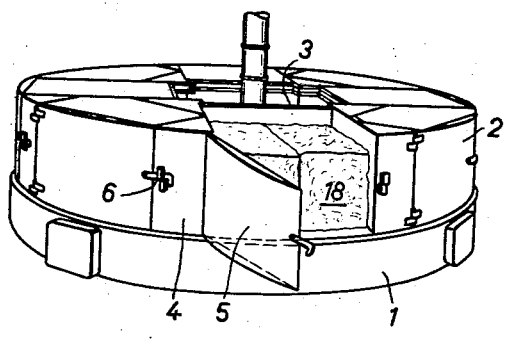
FIG. 1 is a perspective view of a bale rasp according to the invention.
Figure 2:
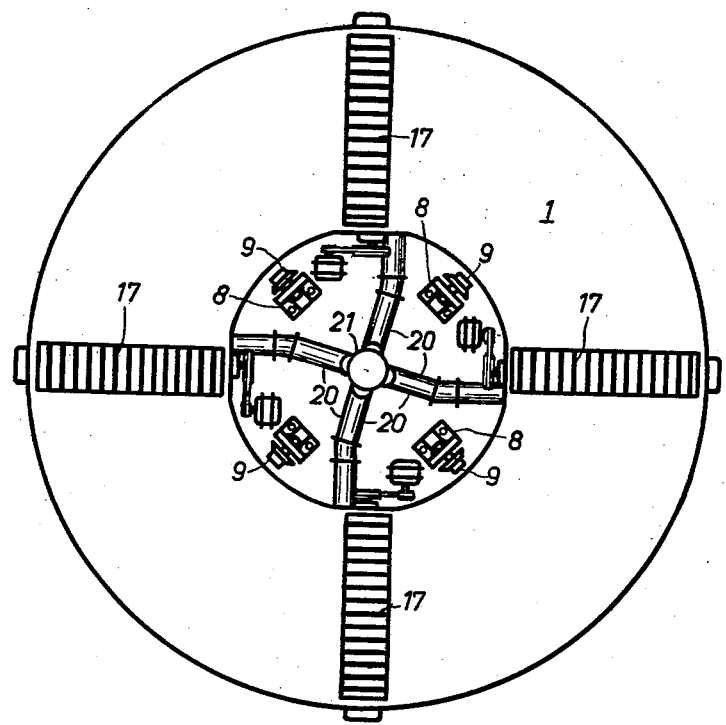
FIG. 2 is a diagrammatic plan view of the rasp shown in FIG. 1 with the frame holding the bales removed.

The bale rasp shown in FIGS. 1 and 2 comprises a horizontal annular table or plate 1 and a frame 2 which is rotatable over said plate around a vertical axis extending through the center of the table. The frame 2 comprises an inside wall, an outside wall spaced from the inside wall and partitions or means dividing the space between said walls into a plurality of cells 3 which are open on top and on the bottom and adapted to receive bales 18 which must be opened or reduced. The frame has a circumferential wall 4 including swing doors 5 to provide access to the cells from the side of the device. Locks 6 are provided on the doors and on the wall 4 to securely lock the doors in closed position.

Figure 4:
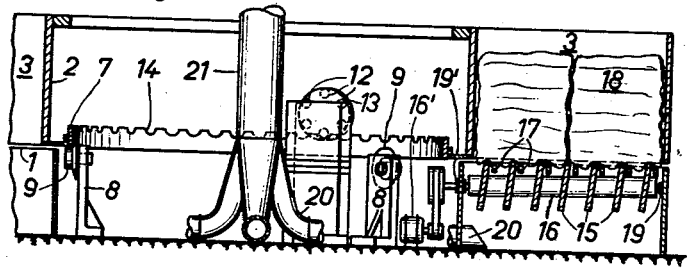
FIG. 4 is a vertical sectional view of the rasp shown in FIG. 1, the section being made along line IV—IV of FIG. 3.
Figure 3:
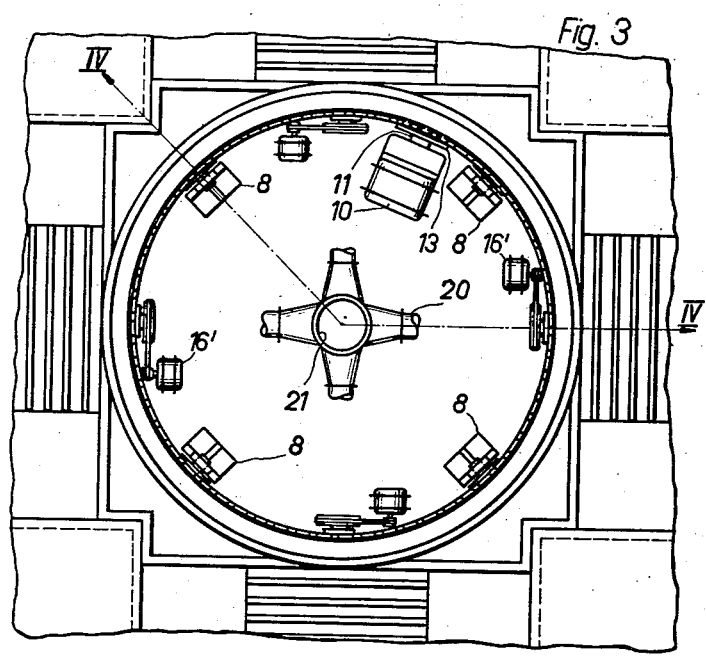
FIG. 3 is a diagrammatic large scale plan view of the center portion of the rasp with the frame holding the bales and a portion of the pneumatic transfer system for the fibre tufts removed.

As seen in FIGS. 3 and 4 the frame 2 includes an annular rack 7 resting on four equally spaced rollers 9 carried by supports 8. The frame 2 is rotated by means of a motor 10 having a shaft 11 to which a disc 13 provided at its circumference with axial pins 12 adapted to engage the teeth 14 of the rack 7 is connected. Oblong grates 17 extend substantially radially from the center of the table 1 and have bars extending normal to the longitudinal axis of the grates. A shaft of a reducing element 16 is rotatably supported below each grate and in substantially the same vertical plane as is the longitudinal axis of the respective grate, discs 15 having saw teeth on their circumferences being mounted in a slanted position on said shaft and having portions extending between and above the grate bars for reducing the bales 18 passing over the grate. The bearings 19 supporting the outer ends of the shafts of the reducing elements 16 are preferably somewhat closer to the surface of the table 1 than the bearings 19' which support the inner ends of the shafts so that the outer saw discs extend farther above the grate bars than the inner saw discs. In this way the difference between the reducing effect of the inner saw discs and of the outer saw discs which difference is caused by the circular path of the bales, is compensated. The relation between the effective width, i.e. the length, of the reducing elements 16 and the mean radius of the part of the bottom surface of the bale which is engaged by the reducing element determines the degree of inclination of the shaft of the reducing or rasping device. For removing the fibre tufts which have been torn from the bales the inlet of a suction tube 20 is placed below each reducing or rasping device 16. The suction tubes 20 are united in a central tube 21. The reducing elements are individually driven by motors 16'.

A preferred arrangement of the cells of a frame 2 for accommodating twelve bales 18 is illustrated in FIGS. 1, 6 and 7. Four cells 22 are adapted to receive two bales each which are shown in broken lines. These four cells are symmetrically placed with respect to the rotation axis of the frame and utilize the entire length of the reducing elements. The cells 23 which alternate with the cells 22 receive one bale each which is shown in solid lines and is close to the periphery of the plate 1. In the arrangement shown in FIGS. 1, 2 and 6 four equally spaced reducing devices are provided and the two-bale cells 22 move simultaneously over the four grates 17 and more fibre tuft is produced than when the one-bale cells move over the grates. This widely changing production can be avoided by providing five reducing elements as shown in FIG. 7.

Figure 5:
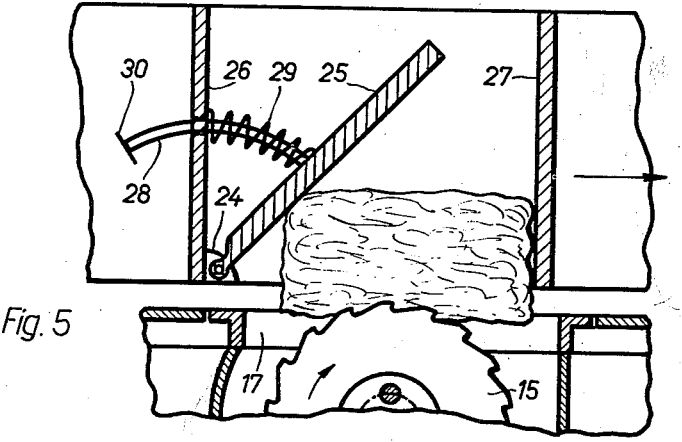
FIG. 5 is a large scale vertical sectional view of a bale-holding cell of the frame forming part of the rasp according to the invention and of a portion of the rasp table.

The cells in the frame 2 are preferably provided with loading means which press the bales against the reducing elements and which automatically increase the pressure as the bales become smaller. In the example shown in FIG. 5 each loading device includes a heavy flap 25 which is rockable on a hinge 24 mounted to a lower part of the frame. The weight of the flap acting on the bale becomes greater as the bale becomes smaller and compensates the diminishing weight of the bale. The rocking axes of the flaps 25 are horizontal and are at the rear walls 26 of the cells with respect to the travel direction of the cells so that the bales are pressed toward the front walls 27 of the cells with respect to the travel direction. Each flap is provided with a curved bracket 28 extending through an aperture in a cell wall 26 and through a coil spring 29 extending between the flap 25 and the wall 26. A collar 30 at the rear end of the bracket 28 prevents passage of the rear end of the bracket through the aperture in the wall 26 and dropping of the flap on the plate 1 and on the reducing elements.

Movement of the bales in radial direction when the bales travel between two grates 17 is desired, particularly if bales are worked into which grooves are cut by the reducing devices. A similar effect can be produced by offsetting the bars of one grate relatively to the bars of neighboring grates or by offsetting the grates with respect to the rotation axis of the frame by about one half of the width of the grates, as shown in FIG. 2.

I claim:

1. A rasp for reducing fibre bales, comprising a plate having a plane surface whereon the fiber bales rest, a plurality of grates inserted in said plate and extending substantially radially from a common center, rotary reducing elements mounted below said grates and having portions extending through and above said grates, and a frame rotatable over said plate around an axis extending substantially through said common center and normal to the plane of said plate, said frame having means engaging the bales resting on said plate for moving the bales consecutively over said grates.

2. A rasp as defined in claim 1 including loading means rockably mounted on said frame and adapted to engage the bales resting on said plate for pressing the bales against said plate.

3. A rasp according to claim 2 wherein said plate and the rocking axes of said loading means are horizontal and said rocking axes are substantially radial with respect to the rotation axis of said frame.

4. A rasp for reducing fibre bales comprising a plate having a plane surface whereon the fibre bales rest, a plurality of grates inserted in said plate and extending substantially radially from a common center, rotary reducing elements mounted below said grates and having portions extending through said grates, and a frame rotatable over said plate around an axis extending substantially through said common center and normal to the plane of said plate, said frame comprising an inside wall, an outside wall spaced from said inside wall, and means dividing the space between the walls into a plurality of cells accommodating the bales which must be reduced, said cells being open toward said plate and symmetrically placed with respect to the rotation axis of said frame.

5. A bale rasp as defined in claim 4 wherein said cells are alternately adapted to receive a single bale and a plurality of bales placed juxtaposed in radial direction of the rotation axis of the frame.

6. A rasp for reducing fibre bales, comprising a plate having a plane surface whereon the fibre bales rest, a plurality of grates inserted in said plate and extending substantially radially from a common center, said grates having a bale gliding top surface, rotary reducing elements mounted below said grates and having portions extending between said grates into the proximity of the bale gliding top surface of said grates, and a frame rotatable over said plate around an axis extending substantially through said common center and normal to the plane of said plate, said frame having means engaging the bales resting on said plate for moving the bales consecutively over said grates.

7. A rasp for reducing fibre bales, comprising:
a horizontal, plane plate supporting fibre bales,
a plurality of grates inserted in said plate and extending substantially radially from a common center,
a rotary reducing element mounted below each of said grates, each reducing element having a plurality of reducing discs placed in spaced relation on a common axis extending radially from a common center below said first mentioned common center, said reducing discs extending through and above said grates, said reducing elements being so constructed and arranged that each subsequent reducing disc of a reducing element extends further above the respective grate as the radial distance of said discs from the common center wherefrom the common axis of said discs extends, increases, and
a frame rotatable over said plate around an axis extending substantially through said common centers and normal to said plate, said frame having means engaging the bales supported by said plate for moving the bales consecutively over said grates.

8. A rasp for reducing fibre bales, comprising:
a horizontal, plane plate supporting fibre bales,
a plurality of grates inserted in said plate and extending substantially radially from a common center,
a rotary reducing element operatively associated with each of said grates, each reducing element having a shaft rotatably mounted below the respective grate, said shafts extending radially from a common center below said first mentioned common center, a plurality of reducing discs mounted in spaced relation on each of said shafts and extending through and above said grates,
said shafts being so mounted that each subsequent reducing disc of a reducing element extends further above the grates as the distance of said discs from said common centers increases, and
a frame rotatable over said plate around an axis extending substantially through said common centers and normal to said plate, said frame having means engaging the bales supported by said plate for moving the bales consecutively over said grates.

9. A rasp for reducing fibre bales, comprising:
a horizontal, plane plate supporting fibre bales,
a plurality of oblong grates inserted in said plate and extending radially from a common center,
said grates having spaced, parallel bars extending normal to the longitudinal extension of the grates,
the bars of different grates being radially offset,
a rotary reducing element being place below each of said grates, each reducing element having a plurality of reducing discs placed in spaced relation on a common axis and individually extending through the spaces between the bars of the respective grate, and
a frame rotatable over said plate around an axis extending through said common center and normal to said plate, said frame having means engaging the bales supported by said plate for moving the bales consecutively over said grates.

10. A rasp for reducing fibre bales, comprising:
a horizontal, plane plate supporting fibre bales,
a plurality of oblong grates inserted in said plate and extending tangentially from a common circle,
said grates having spaced, parallel bars extending normal to the longitudinal extension of the grates,
a rotary reducing element being placed below each of said grates, each reducing element having a plurality of reducing discs placed in spaced relation on a common axis and individually extending through the spaces between the bars of the respective grate, and
a frame rotatable over said plate around an axis extending through the center of said common circle and normal to said plate, said frame having means engaging the bales supported by said plate for moving the bales consecutively over said grates.

References Cited in the file of this patent

UNITED STATES PATENTS

| | | |
|---|---|---|
| 2,445,912 | Frost | July 27, 1948 |
| 2,938,239 | Leineweber et al. | May 31, 1960 |